US012483416B2

(12) United States Patent
Lee et al.

(10) Patent No.: US 12,483,416 B2
(45) Date of Patent: Nov. 25, 2025

(54) ELECTRONIC DEVICE FOR PERFORMING HASH AUTHENTICATION ON NEURAL NETWORK, AND OPERATING METHOD THEREFOR

(71) Applicant: SAMSUNG ELECTRONICS CO., LTD., Suwon-si (KR)

(72) Inventors: Jongin Lee, Suwon-si (KR); Minjung Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 120 days.

(21) Appl. No.: 18/460,034

(22) Filed: Sep. 1, 2023

(65) Prior Publication Data
US 2023/0412388 A1 Dec. 21, 2023

Related U.S. Application Data

(63) Continuation of application No. PCT/KR2022/001109, filed on Jan. 21, 2022.

(30) Foreign Application Priority Data

Mar. 23, 2021 (KR) .................. 10-2021-0037086

(51) Int. Cl.
*H04L 9/32* (2006.01)
(52) U.S. Cl.
CPC .................. *H04L 9/3236* (2013.01)
(58) Field of Classification Search
CPC ..... H04L 9/3236; H04L 9/3239; G06F 21/51; G06F 21/62; G06F 21/79; G06N 3/04; G06N 3/08
See application file for complete search history.

(56) References Cited

U.S. PATENT DOCUMENTS 8,694,794 B2 * 4/2014 Ishida .................. G06F 21/572
713/189
10,198,280 B2 2/2019 Swidowski et al.
(Continued)

FOREIGN PATENT DOCUMENTS

CN 110401536 11/2019
JP 2011-076134 4/2011
(Continued)

OTHER PUBLICATIONS

International Search Report for PCT/KR2022/001109 mailed Apr. 26, 2022, 4 pages.
(Continued)

*Primary Examiner* — SM A Rahman
(74) *Attorney, Agent, or Firm* — NIXON & VANDERHYE P.C.

(57) ABSTRACT

An electronic device for performing hash authentication on a neural network, and an operating method therefor are disclosed. The disclosed electronic device comprises: a processor and a memory having at least one instruction executable by the processor. If at least one instruction is executed by the processor, the processor can be configured to: generate a hash value on the basis of parameters of a neural network used for an application to be executed, determine whether the generated hash value matches the pre-stored reference hash value in the security area of the processor, and approve the loading of the neural network in response to whether the generated hash value matches the reference hash value in the general area of the processor.

13 Claims, 7 Drawing Sheets

(56) References Cited

U.S. PATENT DOCUMENTS

| | | | |
|---|---|---|---|
| 11,715,005 B2* | 8/2023 | Talmi | G06N 3/08 |
| | | | 713/171 |
| 2019/0056931 A1 | 2/2019 | Ding et al. | |
| 2020/0193295 A1 | 6/2020 | Talmi | |
| 2020/0259660 A1 | 8/2020 | Tewari et al. | |
| 2020/0285753 A1* | 9/2020 | Buendgen | G06F 21/577 |
| 2020/0349441 A1* | 11/2020 | Zhang | G06N 3/047 |
| 2021/0357733 A1* | 11/2021 | Leong | G06N 3/063 |

FOREIGN PATENT DOCUMENTS

| | | |
|---|---|---|
| JP | 2019-185135 | 10/2019 |
| KR | 10-1081729 | 11/2011 |
| KR | 10-2020-0071822 | 6/2020 |
| KR | 10-2020-0083874 | 7/2020 |
| KR | 10-2152615 | 9/2020 |

OTHER PUBLICATIONS

Written Opinion of the ISA for PCT/KR2022/001109 Apr. 26, 2022, 5 pages.
Office Action for KR Application No. 10-2021-0037086 dated Sep. 9, 2025 and English translation, 6 pages.

* cited by examiner

ELECTRONIC DEVICE FOR PERFORMING HASH AUTHENTICATION ON NEURAL NETWORK, AND OPERATING METHOD THEREFOR

CROSS-REFERENCE TO RELATED APPLICATIONS

This application is a continuation of International Application No. PCT/KR2022/001109 designating the United States, filed on Jan. 21, 2022, in the Korean Intellectual Property Office and claiming priority to Korean Patent Application No. 10-2021-0037086, filed on Mar. 23, 2021, in the Korean Intellectual Property Office, the disclosures of each of which are incorporated by reference herein in their entireties.

BACKGROUND

Field

The disclosure relates to an electronic device for performing hash authentication on a neural network and an operating method thereof.

Description of Related Art

With the recent advancement of artificial intelligence, many neural networks are being used in various types of software. For example, applications that come already installed on electronic devices by manufacturers offer a wide range of services using neural networks. When a neural network used by an application executed in an electronic device is altered or replaced by malicious attacks, it may pose a security threat by producing incorrect inference results. For example, when a neural network used for biometric authentication is altered, authentication may be completed even for individuals who are not actually registered users.

With the advancement of neural network technology, various security-sensitive services such as authentication and payment based on neural networks are widely used. However, the integrity validation of neural networks is currently lacking.

SUMMARY

Embodiments of the disclosure provide an electronic device that may be possible to provide hash authentication based on the parameters of a neural network for validating the integrity of the neural network executed.

Embodiments of the disclosure may provide a hash value that ensures the integrity of a neural network may be generated based on the parameters of the neural network rather than being generated for the entire binary file of the neural network. Accordingly, valid hash authentication using an existing hash value may be performed as long as the parameters of the neural network remain the same, even if there are changes in the type or version of a deep learning framework.

According to an example embodiment, an electronic device may include: a processor and a memory configured to store at least one instruction executable by the processor, wherein in response to the at least one instruction being executed by the processor, the processor may be configured to: generate a hash value based on parameters of a neural network used for an application to be executed, determine whether the generated hash value matches a pre-stored reference hash value in a secure portion of the processor, and approve loading of the neural network in response to the generated hash value matching the reference hash value in a normal portion of the processor.

According to an example embodiment, a method of operating an electronic device may include: generating a hash value based on parameters of a neural network used for an application to be executed, determining whether the generated hash value matches a pre-stored reference hash value in a secure portion of a processor included in the electronic device, approving loading of the neural network in response to the generated hash value matching the reference hash value in a normal portion of the processor, and denying the loading of the neural network in response to the generated hash value mismatching the reference hash value.

According to various example embodiments, it may be possible to ensure the integrity of a neural network by performing hash authentication on the neural network before the neural network is executed on an electronic device.

In addition, according to various example embodiments, it may be possible to perform hash authentication that is robust to the type or version of a deep learning framework by extracting parameters of a neural network, serializing the parameters, and generating a hash value, without relying on the binary of the neural network. Accordingly, it may be possible to freely set an update time point of an application using the neural network, irrespective of a binary update time point of the electronic device at which the reference hash value stored in the secure world may be updated.

In addition, various effects that may be directly or indirectly ascertained through the present disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the accompanying drawings. When describing the embodiments with reference to the accompanying drawings, like reference numerals refer to like elements and a repeated description related thereto may be omitted.

Figure 1:
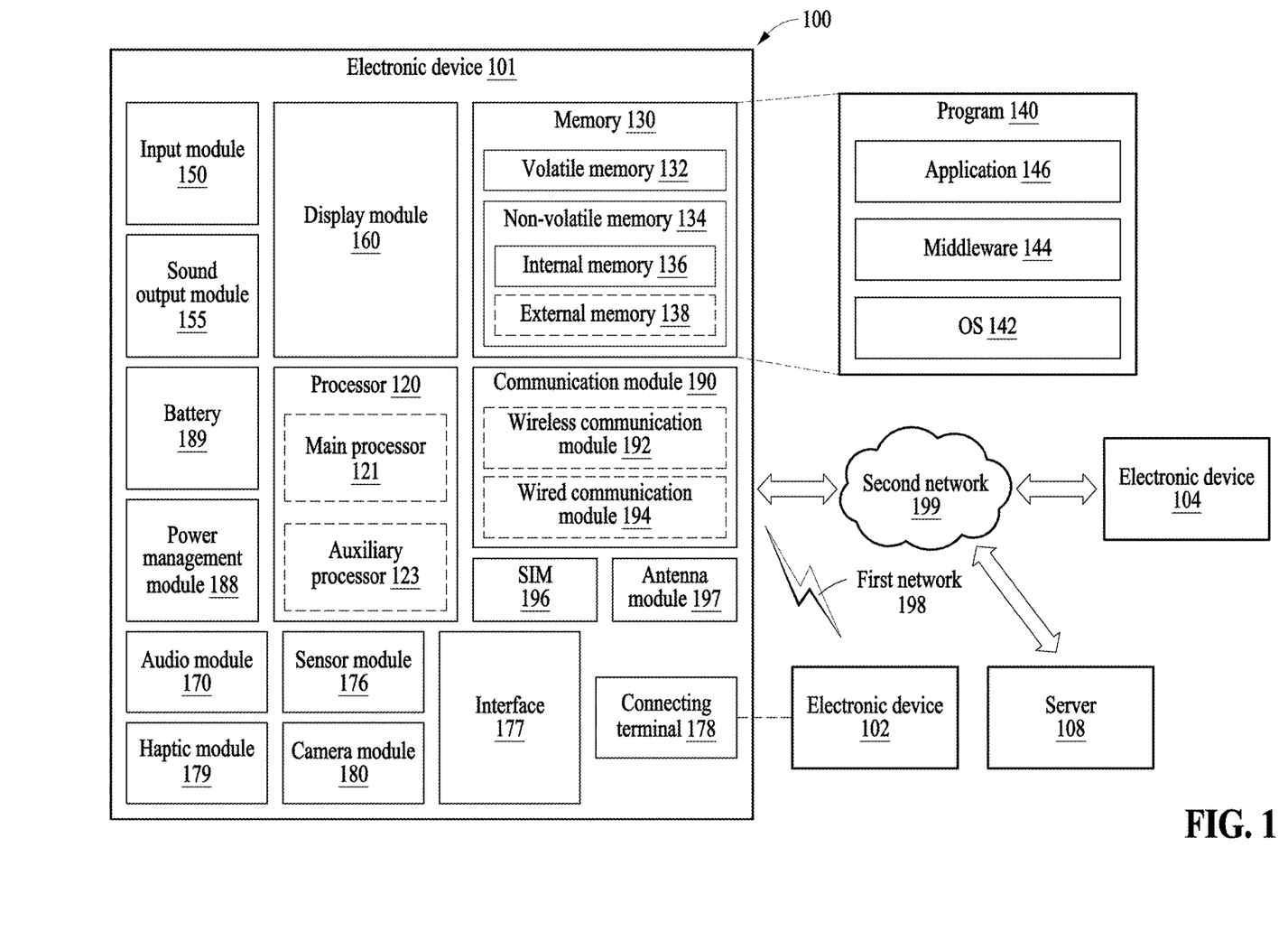
FIG. 1 is a block diagram illustrating an example electronic device in a network environment according to various embodiments.

FIG. 1 is a block diagram illustrating an example electronic device in a network environment according to various embodiments.

FIG. 1 is a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added in the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., an NPU) may include a hardware structure specified for artificial intelligence model processing. An artificial intelligence model may be generated through machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure the intensity of force incurred by the touch.

The audio module 170 may convert a sound into an electrical signal and vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed at the electronic device 101 may be executed at one or more external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
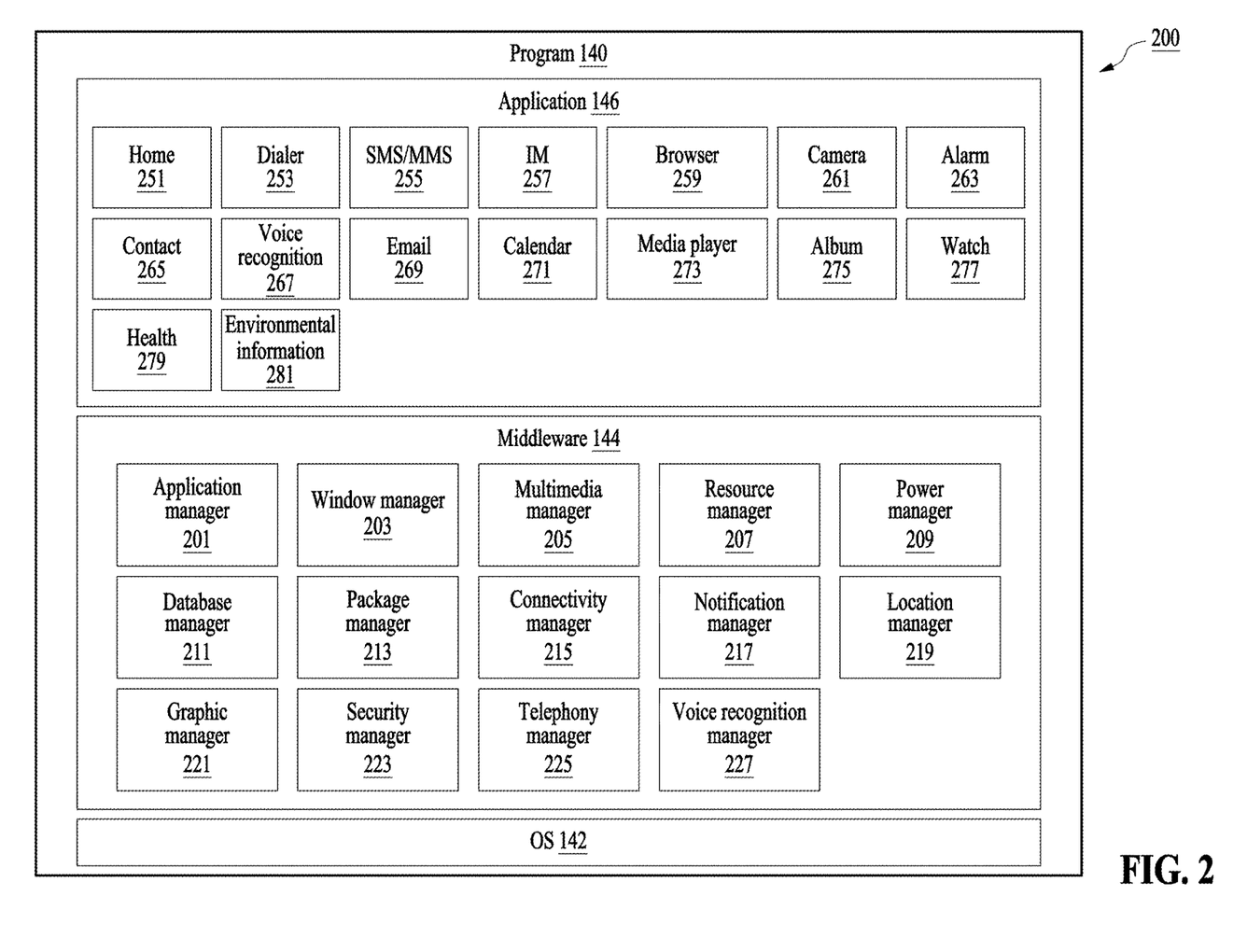
FIG. 2 is a block diagram illustrating an example configuration of a program according to various embodiments.

FIG. 2 is a block diagram illustrating an example configuration of a program according to various embodiments.

FIG. 2 is a block diagram 200 illustrating a program 140 according to various embodiments. According to an embodiment, the program 140 may include an OS 142 to control one or more of resources of the electronic device 101, middleware 144, and/or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from one or more of the formats. The resource manager 207, for example, may manage a source code of the application 146 or a memory space of the memory 130. The power manager 209, for example, may manage the capacity, temperature, or power of the battery 189, and may determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or an update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alarm). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an embodiment, the middleware 244 may dynamically delete some existing components or add new components. According to an embodiment, at least part of the middleware 144 may be included as part of the OS 142 or may be implemented as another piece of software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchange application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support the installation, deletion, or update of an application being operated on the external electronic device.

The electronic device according to the embodiments disclosed herein may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B or C", "at least one of A, B and C", and "at least one of A, B, or C", may include any one of, or all possible combinations of the items listed enumerated together a corresponding one of the phrases. Terms such as "$1^{st}$", "$2^{nd}$", or "first" or "second" may be used to simply distinguish a corresponding component from another, and does not limit the components in other aspect (e.g., important or order). It is to be understood that if a component (e.g., a first component) is referred to, with or without the term "operatively" or "communicatively", as "coupled with", "coupled to", "connected with", or "connected to" another component (e.g., a second component), the component may be coupled with the other component directly (e.g., by wire), wirelessly, or via a third component.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
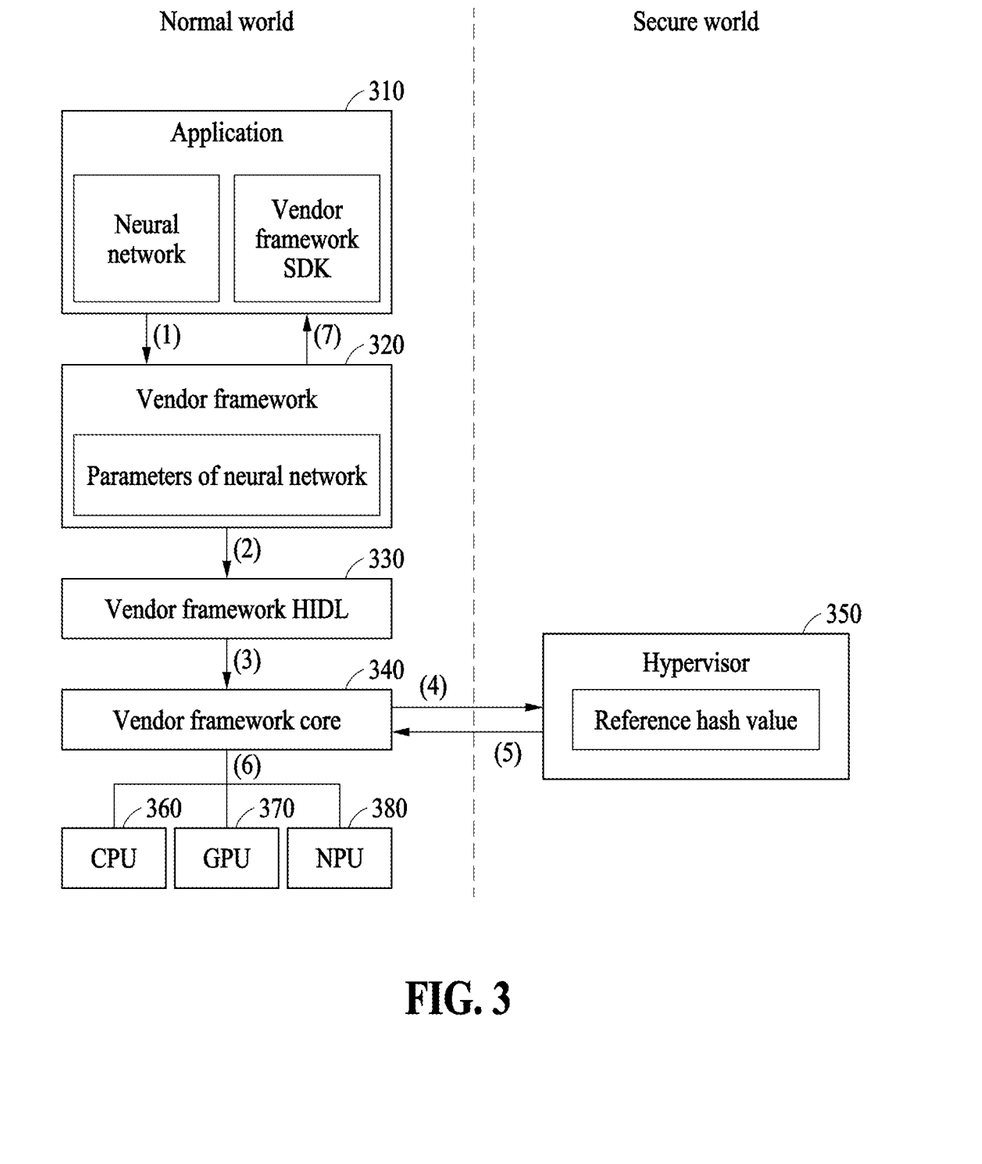
FIG. 3 is a diagram illustrating an execution environment of an electronic device according to various embodiments.

FIG. 3 is a diagram illustrating an execution environment of an electronic device according to various embodiments.

Referring to FIG. 3, an electronic device (e.g., the electronic device 101 of FIG. 1) may have an independent secure world (e.g., secure portion or secure area) in a processor (e.g., the processor 120 of FIG. 1) to process security-sensitive or important information. For example, an execution environment of the electronic device may include a normal world (e.g., normal or general portion or normal or general area) and a secure world.

The normal world may include a rich execution environment (REE) area in which a client application (CA) and an OS (e.g., the OS 142 of FIGS. 1 and 2) are driven, and may be referred to as a non-secure world. In addition, the secure world is a hardware-based isolation trusted execution environment (TEE) area that is physically isolated from the normal world, and may execute a trusted application (TA). The CA may be executed on a rich OS of the normal world, and the TA may be executed on a secure OS of the secure world.

In an embodiment, TrustZone technology may be applied to the processor. Addresses of tables used for conversion between virtual addresses and physical addresses through TrustZone technology may differ from each other. Consequently, the normal world and the secure world may access different address spaces. Also, a memory area accessible only from the secure world may be designated.

Various applications 310 (e.g., the application 146 of FIGS. 1 and 2) using a neural network may be executed in the normal world. For example, the applications 310 may include unlocking, login, internet banking, and easy payment based on biometric recognition (e.g., face recognition, fingerprint recognition, iris recognition, retina recognition, voice recognition, hand shape recognition, handwriting recognition), but embodiments are not limited thereto. In operation 1, to execute the applications 310, a session may be generated through a vendor framework software development kit (SDK) and a neural network may be loaded into the session. The neural network may be loaded from a memory belonging to the normal world. The normal world is relatively vulnerable to security threats compared to the secure world, making it possible for a malicious attack to alter or replace a stored neural network. Since the altered or replaced neural network may render biometric recognition ineffective, it may be necessary to verify whether a loaded neural network is altered or replaced through hash-based integrity validation. Hash-based integrity validation is described in detail below.

A vendor framework 320 may refer to a framework provided by a vendor that supports a deep learning framework, and may include, for example, a snapdragon neural processing engine (SNPE), NeuroPilot, and EDEN. The deep learning framework is a framework for performing a deep learning operation, and may include, for example, TensorFlow, Caffe, and PyTorch. In operation 2, the vendor framework 320 may extract parameters of the loaded neural network and may transmit the neural network to vendor framework hardware abstraction layer (HAL) interface definition language (HIDL) 330.

The vendor framework HIDL 330 may include an interface for performing communication between a framework and an HAL. In operation 3, the vendor framework HIDL 330 may transmit the parameters of the neural network to a vendor framework core 340.

The vendor framework core 340 may substantially control hardware resources (e.g., the CPU 360, GPU 370, and NPU 380) in a kernel area. The vendor framework core 340 may generate a hash value based on the parameters of the neural network. In operation 4, the vendor framework core 340 may transmit a hash authentication request to the secure world or a hypervisor 350 to authenticate the neural network. The hash authentication request may be performed based on an instruction (e.g., a hypervisor call (HVC) and a secure monitor call (SMC)) that generates an exception. The HVC may be used to request a hypervisor service in a guest OS, and the SMC may be used to request a service of the secure world in the normal world. The vendor framework core 340 may transmit the hash authentication request by including the generated hash value in the hash authentication request.

The hypervisor 350 may refer to software or a logical platform for simultaneously executing one or more OSs in the electronic device, and may be referred to as a virtual machine monitor (VMM). For example, the hypervisor 350 may manage a secure virtual machine based on hardware resources inaccessible to a normal virtual machine.

The hypervisor 350 may determine whether the generated hash value included in the hash authentication request matches a pre-stored reference hash value. The reference hash value is pre-stored in the hypervisor 350, and may be generated based on parameters of a reference neural network, wherein the reference neural network is stored in a memory of the electronic device at a binary build time point or a binary update time point of the electronic device. When a neural network used for the applications 310 to be executed in the normal world is identical to the reference neural network, the generated hash value matches the reference hash value, and hash authentication may be completed. On the contrary, when the neural network to be used is altered or replaced and thus is different from the reference neural network, the generated hash value mismatches the reference hash value, and hash authentication may fail. In operation 5, the hypervisor 350 may return a hash authentication result to the vendor framework core 340. For ease of description, a hash authentication operation is described based on the hypervisor 350, but the description of the hash authentication operation performed in the hypervisor 350 may also apply to the secure world.

When the hash authentication is completed, the neural network may be approved for loading, as the integrity of the neural network is validated, indicating that the neural network is not altered or replaced. On the contrary, when the hash authentication fails, it indicates that the neural network is altered or replaced, and thus, the loading may be denied. In operation 6, the vendor framework core 340 may utilize a hardware resource (e.g., a CPU, GPU, and NPU) to execute a neural network for which loading is approved.

In operation 7, the vendor framework 320 may return an execution result (e.g., an operation result) of the neural network to the applications 310. The applications 310 may perform a preset operation using the execution result of the neural network.

Figure 4:
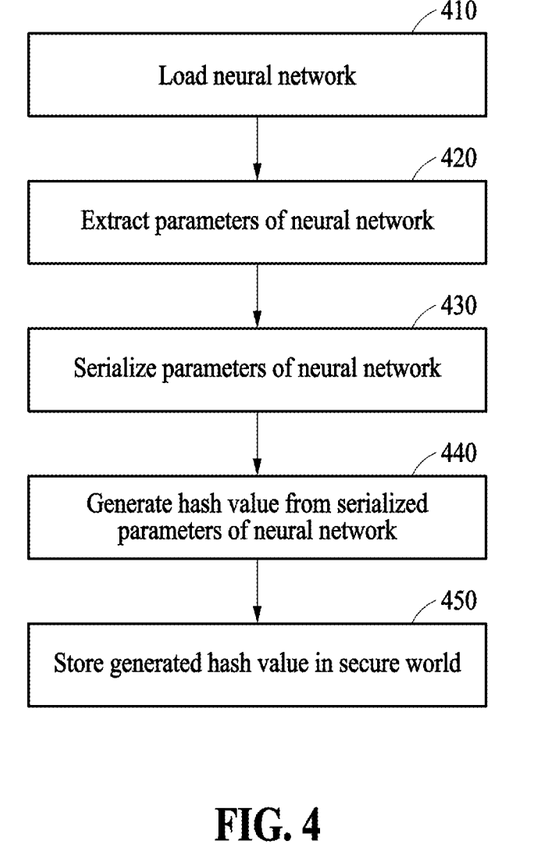
FIG. 4 is a flowchart illustrating an example operation of generating a hash value according to various embodiments.

FIG. 4 is a flowchart illustrating an example operation of generating a hash value according various embodiments.

In the following embodiments, operations may be performed sequentially, but not necessarily sequentially. For example, the order of the operations may be changed, and at least two of the operations may be performed in parallel. Operations 410 to 450 may be performed by at least one component (e.g., the processor 120 of FIG. 1) of an electronic device (e.g., the electronic device 101 of FIG. 1).

In operation 410, the electronic device may load a neural network. The neural network is used in an application (e.g., the application 146 of FIGS. 1 and 2 and the applications 310 of FIG. 3) to be executed on the electronic device, and data inference may be performed through the neural network. The data inference may include, for example, pattern recognition (e.g., object recognition and face identification), sequence recognition (e.g., voice, gesture, and handwritten text recognition, machine translation, and machine interpretation), control (e.g., vehicle control and process control), recommendation services, decision making, medical examination or diagnosis, financial applications, and data mining.

In operation 420, the electronic device may extract parameters of the neural network. For example, the parameters of the neural network may include one or more weights or biases applied to the neural network.

In operation 430, the electronic device may serialize the parameters of the neural network.

Figure 5:
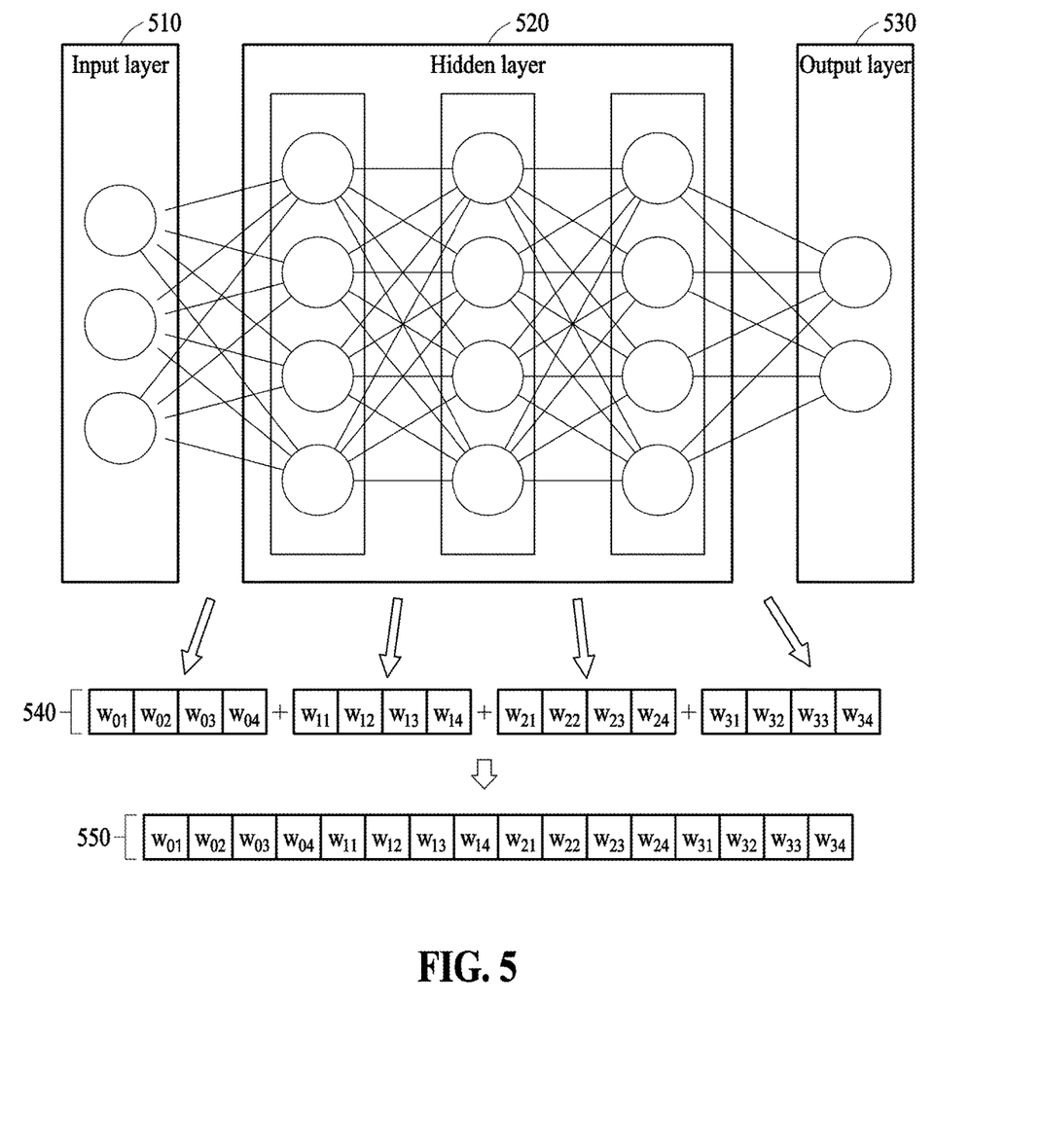
FIG. 5 is a diagram illustrating an example operation of serializing parameters of a neural network according to various embodiments.

With reference to FIG. 5, a description is provided regarding the neural network and parameter serialization. The neural network may include a plurality of layers. The neural network may include an input layer 510, a plurality of hidden layers 520, and an output layer 530. Each of the layers may include a plurality of nodes each referred to as an artificial neuron. Each node may represent a computational unit with one or more inputs and outputs, and the nodes may be connected to each other.

The input layer 510 may include one or more nodes into which data is directly inputted, not through a link in a relationship with other nodes. The output layer 530 may include one or more nodes having no output node in a relationship with other nodes. The hidden layers 520 may correspond to the other layers of the neural network excluding the input layer 510 and the output layer 530, and may include nodes corresponding to an input node or output node in a relationship with other nodes. The neural network is illustrated merely as an example in FIG. 5 for ease of description, and thus it should be understood that the scope of embodiments is not limited by the structure of the neural network. The neural network used in the embodiment may be provided in various structures. A number of hidden layers included in the neural network, a number of nodes included in each layer, and/or a connection between nodes may vary depending on an embodiment.

The neural network including a plurality of hidden layers may be referred to as a deep neural network (DNN).

A weight may be set for a connection between nodes. For example, a predetermined weight may be set for a connection between a node included in the input layer 510 and another node included in a first hidden layer. The weight may be adjusted or changed. The weight amplifies, reduces, or maintains a relevant data value, thereby determining a degree of influence of the data value on a final result. The weight may correspond to a parameter of the neural network.

To each node included in one layer, weighted values of nodes included in a previous layer may be input. A weighted value may refer to a value obtained as a value of a node included in the previous layer is multiplied by a weight. A process of inputting weighted data from a predetermined layer to a next layer may be referred to as propagation. For example, a value y to be propagated, to the subsequent layer, from a node to which weighted data is propagated from the nodes included in the previous layer may be determined as represented by Equation 1.

$$y = f\left(\sum_{i=0}^{n-1} w_i \cdot a_i + b\right)$$ [Equation 1]

In Equation 1 above, $a_i$ may denote a value of an i-th node included in a previous layer, and may be referred to as active. $w_i$ may denote a weight set for a connection with the i-th node included in the previous layer, b may denote a bias, and f may denote an activation function. The activation function may correspond to a sigmoid, a hyperbolic tangent (tanh), or a rectified linear unit (ReLU), but examples of the activation function are not limited thereto.

Weights and biases corresponding to parameters of the neural network may be adjusted or changed through the training of the neural network. Parameters of a neural network once trained may remain unchanged preserved unless further training is performed. When inference is performed through a trained neural network, only weights and biases determined through previous training are used, and corresponding parameter values may not be changed.

In the example of FIG. 5, the electronic device may extract weights 540 from the neural network. For example, the electronic device may extract the weights 540 from the neural network on a layer-by-layer basis. The electronic device may serialize the extracted weights 540. For example, the electronic device may serialize the extracted weights 540 in order of layers. A hash value may be generated based on serialized weights 550. For ease of description, the description of FIG. 5 is provided based on the weights 540. However, the description of the disclosure may also apply when a hash value is generated based on biases or when a hash value is generated based on weights and biases.

The trained neural network may be converted into model binary through the various deep learning frameworks described above. However, a representation of parameters of a neural network or a graph in the model binary may vary across different deep learning frameworks, when a hash value is generated based on the model binary, hash authentication may fail depending on a type or version of a deep learning framework. When the parameters are extracted from the neural network and serialized, and then a hash value is generated, it may be possible to generate the same hash value regardless of the type or version of the deep learning framework. This enables hash authentication that is robust to the type or version of the deep learning framework to be performed.

Returning to FIG. 4, in operation 440, the electronic device may generate a hash value from the serialized parameters of the neural network.

In operation 450, the electronic device may store the generated hash value in a secure world of a processor. When the neural network is used in the application to be executed on the electronic device, the hash value stored in the secure world may be used for hash authentication for validating the integrity of the neural network. Whether the neural network used in the application is altered or replaced by a malicious attack may be determined based on whether the hash value generated based on the parameters of the neural network to be used matches a hash value pre-stored in the secure world. Herein, for ease of description, a hash value stored in a secure world for hash authentication may be referred to as a reference hash value, and a neural network used for generating the reference hash value may be referred to as a reference neural network. Through hash authentication, it may be determined whether a neural network to be used is identical to a reference neural network.

An operation of generating a hash value based on parameters of the neural network to be used may be performed through operations 410 to 440.

According to an embodiment, there may be one or a plurality of neural networks that may be executed on the electronic device. Since the reference hash value is generated for each neural network through operations 410 to 440, when there is the plurality of neural networks that may be executed on the electronic device, a plurality of reference hash values may be stored in the secure world. The electronic device may extract the parameters of the neural network used in the application to be executed and serialize the parameters to generate the hash value, and may determine whether the generated hash value matches one of the plurality of reference hash values stored in the secure world. When the generated hash value matches one of the plurality of reference hash values, hash authentication may be completed. When the generated hash value matches none of the plurality of reference hash values, the hash authentication may fail.

Operations 410 to 450 of FIG. 4 may be performed on a reference neural network stored in the memory of the electronic device at a binary build time point of the electronic device. Also, a binary update for the electronic device may be performed, and in this case, the neural network may be updated as well. Since the parameters of the neural network may be changed due to the update to the neural network, a reference hash value generated based on the changed parameters may be stored in the secure world through operations 410 to 450.

Figure 6:
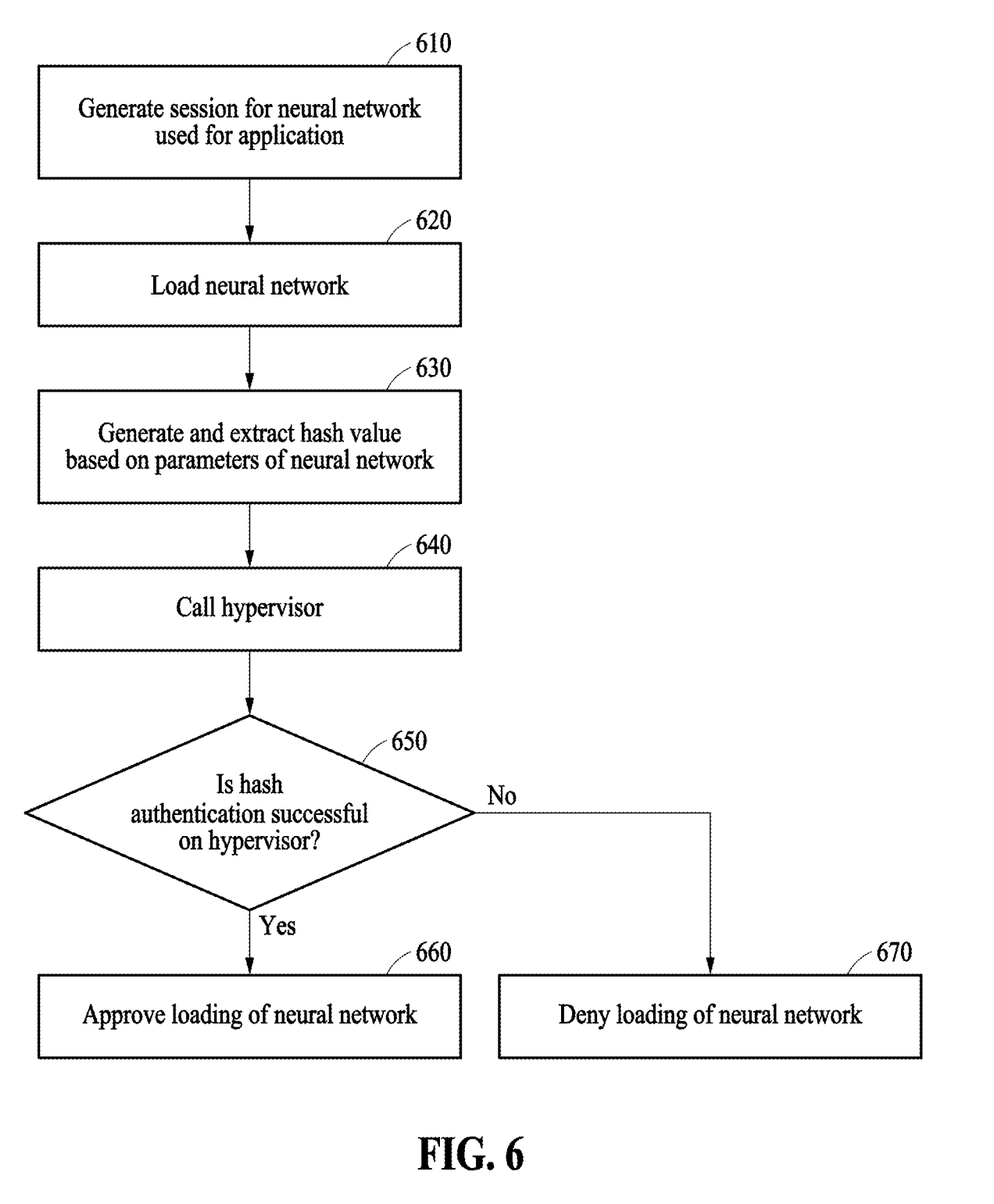
FIG. 6 is a flowchart illustrating an example operation of performing hash authentication according to various embodiments.

FIG. 6 is a flowchart illustrating an example operation of performing hash authentication according to various embodiments.

In the following example embodiments, operations may be performed sequentially, but not necessarily sequentially. For example, the order of the operations may be changed, and at least two of the operations may be performed in parallel. Operations 610 to 670 may be performed by at least one component (e.g., the processor 120 of FIG. 1) of an electronic device (e.g., the electronic device 101 of FIG. 1).

In operation 610, the electronic device may generate a session for a neural network used for an application (e.g., the application 146 of FIGS. 1 and 2 and the applications 310 of FIG. 3) to be executed in a normal world of a processor.

In operation 620, the electronic device may load the neural network into the session.

In operation 630, the electronic device may extract parameters of the neural network, serialize the parameters, and generate a hash value. For example, the electronic device may generate the hash value by extracting the parameters through an application programming interface (API) of a deep learning framework and serializing the extracted parameters.

In operation 640, the electronic device may call a hypervisor (e.g., the hypervisor 350 of FIG. 3) to perform hash authentication for the neural network to be used. For example, the electronic device may include the generated hash value in an HVC or an SMC and transmit the hash value to a secure world of the processor.

In operation 650, the electronic device may determine whether the generated hash value matches a pre-stored reference hash value in the secure world of the processor. When a plurality of reference hash values is stored in the secure world, the electronic device may determine whether the generated hash value matches one of the plurality reference hash values.

In the processor of the electronic device according to an embodiment, exception levels may be divided based on an operational authority. For example, the processor may be an advanced RISC machines (ARM) processor, exception level 0 (EL0) may be a user mode, EL1 may be a supervisor mode or a kernel mode, EL2 may be a hypervisor mode, and EL3 may be a secure mode or a TrustZone mode. From a lower-level mode to a higher-level mode (e.g., from EL0 to EL2), authority becomes stronger, and access to a memory area in the higher-level mode may be denied in the lower-level mode. For example, at EL2, access to memory areas allocated to EL3 and EL4 may be denied.

The above-described hash authentication performed in the secure world may be performed at EL2 or EL3. Operations of the application or the electronic device executed in the normal world is performed at EL0 or EL1, therefore, it may not be possible to determine whether hash authentication is performed at EL2 or EL3, or a result of hash authentication. Even if a malicious attack exposes or manipulates the operations performed at EL0 or EL1 security for hash authentication may be maintained.

The electronic device may return a result (e.g., completion or failure of hash authentication) of hash authentication performed in the secure world to the normal world.

In operation 660, the electronic device may approve loading of the neural network in response to the generated hash value matching the reference hash value (Yes in operation 650). When the generated hash value matches the reference hash value, it implies that the neural network to be executed is not altered or replaced and is identical to the reference neural network, and thus, a valid inference result may be obtained through the neural network. The electronic device may perform data inference by loading the neural network and perform a predetermined operation based on a result of the inference.

In operation 670, the electronic device may deny the loading of the neural network in response to the generated hash value mismatching the reference hash value (No in operation 650). When the generated hash value mismatches the reference hash value, it implies that the neural network to be executed is altered or replaced and is different from the reference neural network, and thus, a valid reference result may not be obtained through the neural network. Accordingly, the electronic device may deny the loading of the neural network and notify the result to at least one of a user, an administrator, a manufacturer, and a developer of the electronic device.

In an embodiment, by performing hash authentication based on the parameters of the neural network rather than binary of the neural network, even if an application using the neural network is updated and a type or version of the deep learning framework is changed, valid hash authentication may be performed without changing the reference hash value, as the parameters of the neural network are the same. Accordingly, it may be possible to freely set an update time point of the application using the neural network, irrespective of a binary update time point of the electronic device at which the reference hash value stored in the secure world may be updated.

According to an example embodiment, a method of operating an electronic device may include: generating a hash value based on parameters of a neural network used for an application to be executed, determining whether the generated hash value matches a pre-stored reference hash value in a secure area of a processor included in the electronic device, approving loading of the neural network in response to the generated hash value matching the reference hash value in a general area of the processor, and denying the loading of the neural network in response to the generated hash value mismatching the reference hash value.

According to an example embodiment, in the method of operating the electronic device, the generating of the hash value may include serializing parameters extracted from the neural network and generating the hash value from the serialized parameters in the general area.

According to an example embodiment, in the method of operating the electronic device, the parameters of the neural network may include one or more weights and biases applied to the neural network.

According to an example embodiment, in the method of operating the electronic device, the generated hash value may be included in a hypervisor call (HVC) or a secure monitor call (SMC) and transmitted from the general area to the secure area.

According to an example embodiment, in the method of operating the electronic device, whether the generated hash value matches the reference hash value may be determined at a higher level inaccessible to a level at which the application is executed.

According to an example embodiment, in the method of operating the electronic device, whether the generated hash value matches the reference hash value may be determined in one of a hypervisor mode and a secure mode of the processor.

According to an example embodiment, in the method of operating the electronic device, the reference hash value may be generated based on parameters of a reference neural network and stored in the secure area of the processor, wherein the reference neural network is stored in the memory at a binary build time point of the electronic device.

According to an example embodiment, in the method of operating the electronic device, the reference hash value may be updated based on parameters of an updated reference neural network, which is stored in the memory at a binary update time point of the electronic device, and the updated reference hash value may be stored in the secure area of the processor.

Figure 7:
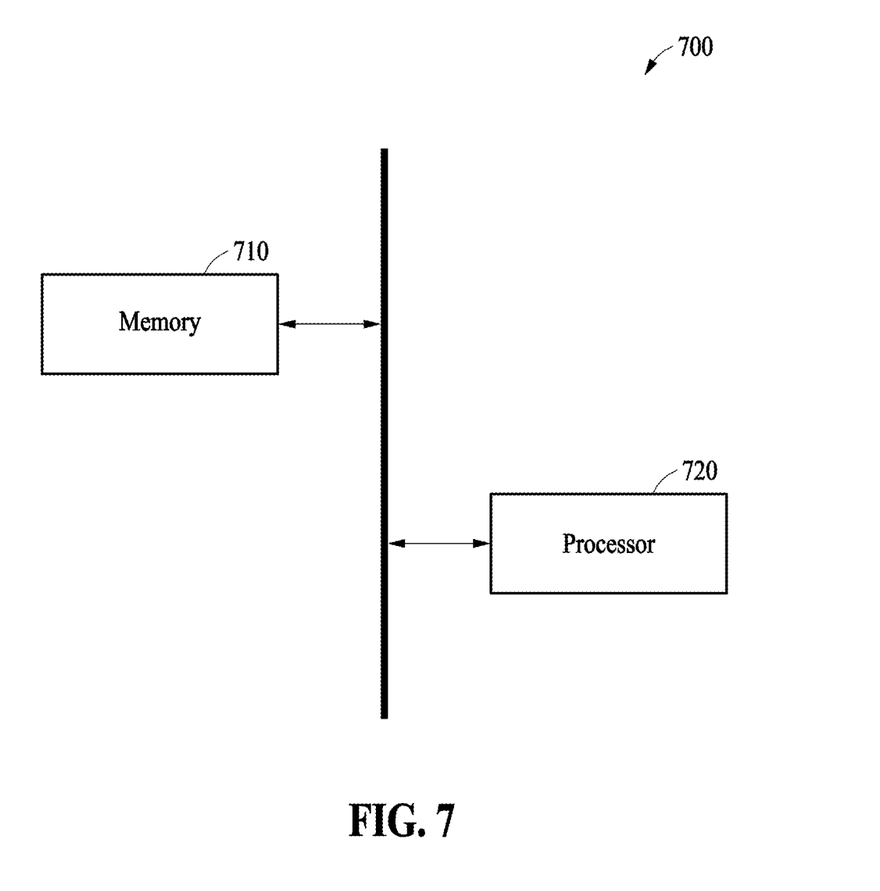
FIG. 7 is a block diagram illustrating an example configuration of an electronic device according to various embodiments.

FIG. 7 is a diagram illustrating an example configuration of an electronic device according to various embodiments.

Referring to FIG. 7, an electronic device 700 (e.g., the electronic device 101 of FIG. 1) according to an embodiment may include a memory 710 (e.g., the memory 130 of FIG. 1) and a processor (e.g., including processing circuitry) 720 (e.g., the processor 120 of FIG. 1).

The memory 710 may include computer-readable instructions. The processor 720 may perform the operations described above when the instructions stored in the memory 710 are executed by the processor 720. The memory 710 may be a volatile memory or a non-volatile memory. The processor 720 may be a device that executes instructions or programs or that controls the electronic device 700.

The electronic device 700 according to an embodiment may be implemented as a user terminal. The user terminal may include, for example, various computing devices such as a mobile phone, a smartphone, a tablet computer, a laptop, a personal computer (PC), or an e-book device, various wearable devices such as a smart watch, smart eyeglasses, a head-mounted display (HMD), or smart clothes, various home appliances such as a smart speaker, a smart television (TV), or a smart refrigerator, and other devices such as a smart vehicle, a smart kiosk, an Internet of things (IoT) device, a walking assist device (WAD), a drone, or a robot. The electronic device 700 may directly obtain data (e.g., an image, a voice, and notes) to be inferred through a neural network used for an application (e.g., the application 146 of FIGS. 1 and 2 and the applications 310 of FIG. 3) to be executed. When hash authentication performed on the neural network is completed, the electronic device 700 may perform data inference and operate the application based on an inference result. On the contrary, when the hash authentication performed on the neural network fails, the electronic device 700 may notify the result to at least one of a user, an administrator, a manufacturer, and a developer of the electronic device 700.

The electronic device 700 according to an embodiment may be implemented as a server. The server is a separate device different from a user terminal controlled by the user, and may communicate with the user terminal through a wired and/or wireless network. The data to be inferred through the neural network may be collected from the user terminal and transmitted to the server through a network. For example, when the application to be executed by the user terminal uses the neural network, the user terminal may transmit the data to be inferred to the server through the neural network. The server may perform the hash authentication on the neural network based on an inference request. When the hash authentication performed on the neural network is completed, the server may input the data received from the user terminal into the neural network, perform data reference, and transmit a reference result to the user terminal. The user terminal may operate the application based on the reference result received from the server. On the other hand, when the hash authentication performed on the neural network fails in the server, the server may notify the user terminal of the result. In addition, the server may notify at least one of an administrator, a manufacturer, and a developer of the server of the hash authentication failure.

In addition, the electronic device may process the operations described above.

According to an example embodiment, an electronic device may include: a processor and a memory configured to store at least one instruction executable by the processor, wherein in response to the at least one instruction being executed by the processor, the processor may be configured to: generate a hash value based on parameters of a neural network used for an application to be executed, determine whether the generated hash value matches a pre-stored reference hash value in a secure area of the processor, and approve loading of the neural network in response to the generated hash value matching the reference hash value in a general area of the processor.

According to an example embodiment, in the electronic device, the processor may be configured to: serialize parameters extracted from the neural network and generate the hash value from the serialized parameters in the normal world.

According to an example embodiment, in the electronic device, the parameters of the neural network may include one or more weights and biases applied to the neural network.

According to an example embodiment, in the electronic device, the generated hash value may be included in a hypervisor call (HVC) or secure monitor call (SMC) and the processor may be configured to transmit the generated hash value from the general area to the secure area of the processor.

According to an example embodiment, in the electronic device, whether the generated hash value matches the reference hash value may be determined at a higher level inaccessible to a level at which the application is executed.

According to an example embodiment, in the electronic device, whether the generated hash value matches the reference hash value may be determined in at least one of a hypervisor mode and a secure mode of the processor.

According to an example embodiment, in the electronic device, the reference hash value may be generated based on parameters of a reference neural network and stored in the secure world of the processor, wherein the reference neural network is stored in the memory at a binary build time point of the electronic device.

According to an example embodiment, in the electronic device, the reference hash value may be updated based on parameters of an updated reference neural network, which is stored in the memory at a binary update time point of the electronic device, and the updated reference hash value may be stored in the secure area of the processor.

According to an example embodiment, in the electronic device, the neural network, which is approved for loading by the processor, may be loaded and executed on at least one of an accelerator and the processor included in the electronic device, and the processor may execute the application based on an execution result of the neural network.

According to an example embodiment, in the electronic device, the processor may be configured to deny the loading of the neural network in response to the generated hash value mismatching the reference hash value.

According to an example embodiment, the electronic device may be a user terminal configured to execute the application using the neural network or a server configured to receive, from the user terminal, inference target data input into the neural network.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
at least one processor including processing circuitry; and
a memory configured to store at least one instruction executable by the processor,
wherein, in response to the at least one instruction being executed individually and/or collectively by the at least one processor, the at least one processor is configured to:
generate a hash value based on parameters of a neural network used for an application to be executed, wherein the parameters of the neural network comprise weights and biases applied to each node value of nodes included in multiple layers of the neural network, and wherein the generated hash value is robust to a type or version of a deep learning framework configured to convert the neural network into model binary;
determine whether the generated hash value matches a pre-stored reference hash value in a secure area of the processor; and
approve loading of the neural network in response to the generated hash value matching the reference hash value in a general area of the processor.

2. The electronic device of claim 1, wherein the at least one processor is configured to serialize parameters extracted from the neural network and generate the hash value from the serialized parameters in the normal portion.

3. The electronic device of claim 1, wherein the generated hash value is comprised in a hypervisor call (HVC) or a secure monitor call (SMC) and the at least one processor is configured to transmit the generated hash value from the general area to the secure area of the processor.

4. The electronic device of claim 1, wherein whether the generated hash value matches the reference hash value is determined at a level inaccessible to a level at which the application is executed.

5. The electronic device of claim 1, wherein the at least one processor is configured to determine whether the generated hash value matches the reference hash value in one of a hypervisor mode and a secure mode of the processor.

6. The electronic device of claim 1, wherein the at least one processor is configured to: generate the reference hash value based on parameters of a reference neural network and stored in a secure area of the processor, wherein the reference neural network is stored in the memory at a binary build time point of the electronic device.

7. The electronic device of claim 1, wherein the processor is configured to:
update the reference hash value based on parameters of an updated reference neural network, which is stored in the memory at a binary update time point of the electronic device, and
store the updated reference hash value in a secure area of the at least one processor.

8. The electronic device of claim 1, wherein the at least one processor is configured to:
load and execute the neural network, which is approved for loading by the at least one processor, on at least one of an accelerator and the at least one processor of the electronic device, and
execute the application based on an execution result of the neural network.

9. The electronic device of claim 1, wherein the at least one processor is configured to deny loading of the neural network in response to the generated hash value mismatching the reference hash value.

10. The electronic device of claim 1, wherein the electronic device includes a user terminal configured to execute the application using the neural network or a server configured to receive, from the user terminal, inference target data input into the neural network.

11. A method of operating an electronic device, the method comprising:
generating a hash value based on parameters of a neural network used for an application to be executed;
determining whether the generated hash value matches a pre-stored reference hash value in a secure area of a processor of the electronic device;
approving loading of the neural network in response to the generated hash value matching the reference hash value in a general area of the processor; and
denying the loading of the neural network in response to the generated hash value mismatching the reference hash value,
wherein the parameters of the neural network comprise weights and biases applied to each node value of nodes included in multiple layers of the neural network, and wherein the generated hash value is independent of a type or version of a deep learning framework configured to convert the neural network into model binary.

12. The method of claim 11, wherein the generating of the hash value comprises serializing parameters extracted from the neural network and generating the hash value from the serialized parameters in the general area.

13. The method of claim 11, wherein the generated hash value is comprised in a hypervisor call (HVC) or a secure monitor call (SMC) and transmitted from the general area to the secure area.

* * * * *